(12) United States Patent
Vazhenin et al.

(10) Patent No.: US 11,681,009 B1
(45) Date of Patent: Jun. 20, 2023

(54) METHOD AND DEVICE FOR REDUCING MULTIPATH CHANNEL EFFECTS ON PHASE MEASUREMENTS IN NAVIGATION RADIO SYSTEMS

(71) Applicant: Topcon Positioning Systems, Inc., Livermore, CA (US)

(72) Inventors: Nikolay Afanasyevich Vazhenin, Moscow (RU); Fedor Borisovich Serkin, Moscow (RU); Andrey Vladimirovich Veitsel, Moscow (RU)

(73) Assignee: Topcon Positioning Systems, Inc., Livermore, CA (US)

( * ) Notice: Subject to any disclaimer, the term of this patent is extended or adjusted under 35 U.S.C. 154(b) by 153 days.

(21) Appl. No.: 17/437,287

(22) PCT Filed: Jan. 13, 2021

(86) PCT No.: PCT/RU2021/000011
§ 371 (c)(1),
(2) Date: Sep. 8, 2021

(87) PCT Pub. No.: WO2022/211654
PCT Pub. Date: Oct. 6, 2022

(51) Int. Cl.
*G01S 5/02* (2010.01)
*G01S 5/10* (2006.01)

(52) U.S. Cl.
CPC .......... *G01S 5/0218* (2020.05); *G01S 5/0226* (2013.01); *G01S 5/10* (2013.01)

(58) Field of Classification Search
CPC ......... G01S 5/0218; G01S 5/0226; G01S 5/10
(Continued)

(56) References Cited

U.S. PATENT DOCUMENTS 10,838,071 B1 * 11/2020 Dybdal .................. G01S 19/30
2009/0147833 A1    6/2009 Pietila et al.
2009/0243927 A1   10/2009 Krach et al.

FOREIGN PATENT DOCUMENTS

CN    108667484 A  * 10/2018  .......... H04B 1/7075
JP    2010256301 A    11/2010
(Continued)

OTHER PUBLICATIONS

Search Report in PCT/RU2021/000011, dated Nov. 11, 2021.
Written Opinion in PCT/RU2021/000011, dated Nov. 11, 2021.

*Primary Examiner* — Harry K Liu
(74) *Attorney, Agent, or Firm* — Bardmesser Law Group (57) ABSTRACT

Method of reducing multipath effects on phase measurements, including receiving radio signals with different pseudo-random codes transmitted by at least four base stations, each at particular frequency received by one channel; measuring delay difference and phase difference from different pairs of base stations; calculating a current position of the receiver based on the measured phase differences and delay differences, wherein the base stations differ in pseudo-random codes at same frequencies or differ in carrier frequency or polarization type if using the same pseudo-random codes, and wherein a number of channels in the receiver exceeds a number of channels needed for the calculating of the current position; detecting anomalous jumps in phase of one or more channels, based on first or second derivative of the phase, as being indicative of multipath signal reception; removing those channels from calculation of current position; and calculating current position based on remaining channels.

10 Claims, 11 Drawing Sheets

(58) Field of Classification Search
USPC .......................................................... 342/451
See application file for complete search history.

(56) References Cited

FOREIGN PATENT DOCUMENTS

KR    20030037851  A    5/2003
RU        2329521  C2   7/2008

* cited by examiner

METHOD AND DEVICE FOR REDUCING MULTIPATH CHANNEL EFFECTS ON PHASE MEASUREMENTS IN NAVIGATION RADIO SYSTEMS

CROSS REFERENCE TO RELATED APPLICATIONS

This is a US National Phase of PCT/RU2021/000011, filed on Jan. 13, 2021.

BACKGROUND OF THE INVENTION

Field of the Invention

The present invention relates to receiving and processing navigation signals and is intended to increase the efficiency of technical implementation, interference immunity and positioning accuracy in navigation systems, such as local navigation systems and GNSS systems.

Description of the Related Art

Modern navigation receivers of local and global positioning systems normally use phase measurements for ensuring high-precision positioning.

However, for many cases, especially in local positioning systems, navigation signals are received together with multipath signals. In such cases, along with fading effects, there are effects related to random jumps of the received signal phase, which strongly affect the accuracy of phase measurements.

In this regard, the problem of increasing phase measurement accuracy for positioning systems based on improved methods and technical tools of compensating for multipath effects in propagated signals are extremely important.

Different methods and devices for correcting multipath channel effects on the accuracy of phase-difference measurements are known, including spaced antennas disclosed, for example in U.S. Pat. Nos. 6,469,654, 4,920,348, 4,373,207 and some others.

There are also technical solutions for compensating negative effects of multipath channels of radio waves propagation on functioning different radio electronic devices, in particular, those determining positioning coordinates of different objects using phase-difference measurements and spaced antenna arrays. Such technical solutions are disclosed, for example, in U.S. Pat. Nos. 7,142,589, 6,469,654, 4,920,348, 7,453,925, 4,373,207, 5,796,773, 6,754,584, 5,914,685 and some others.

U.S. Pat. No. 7,142,589 discloses a method of compensating for multipath components of the received CDMA signal including repeated PRN code. However, the proposed technical solutions are mainly applied to code measurements.

U.S. Pat. No. 4,920,348 describes a method and apparatus to modulate and detect a signal based on a few spaced antennas combined into a phased-antenna array. But this technical solution lacks any possibility of non-linear phase processing.

U.S. Pat. No. 7,453,925 discloses a method and apparatus to reduce propagation of multipath signals. However, this solution cannot be extended to the case of zero-transition of the reflected signal at which non-controlled phase jumps occur.

In U.S. Pat. No. 4,373,207, to decrease multipath effects, it is proposed to reduce a weaker signal level as the phase angle between signals increases. But such a solution does not allow any compensation for non-controlled phase jumps.

U.S. Pat. No. 5,796,773 describes methods of decreasing positioning errors caused by multipath propagation, ionosphere effects and receiver's intrinsic noise thanks to filtration and smoothing of differenced signals, i.e., only with the help of linear methods of signal processing.

U.S. Pat. No. 6,754,584 discloses a system based on two neighboring receiving antennas intended for determination of three-axial orientation of a moving platform with the help of GNSS signals. This system includes also three velocity gyroscopes and three accelerometers tightly fixed to the platform.

U.S. Pat. No. 5,914,685 discloses a method of determining positions of two points based on phase GPS and GLONASS measurements, taking into account unique and different frequencies of their signals. But the proposed solution does not include any methods of multipath rejection.

U.S. Pat. No. 6,469,654 "Transponder landing system", proposes a way of building a transponder of the ground system ensuring planes' landing in multipath environments. This transponder includes some spaced antennas, a set of RF-filters and receiving paths, a local oscillator, blocks of phase amplitude measurement, phase acquisition etc. However, this technical solution cannot compensate for phase jumps occurring in the multipath channel and therefore cannot be used in phase-difference positioning systems.

The proposed invention is intended to improve known technical solutions for phase determination in GNSS systems.

SUMMARY OF THE INVENTION

The objective of the proposed technical solution is to increase accuracy of phase methods for measuring coordinates by reducing multipath effects that impact the accuracy of such measurements.

The main feature of the proposed invention is a redundant number of the channels of current phase estimation; radio channels different not only in code used but also in other parameters, for example, in carrier frequency, polarization type, space position, etc.; nonlinear (logical) filtration of anomalous errors occurred in estimation of current phase in each of measuring channels; channels with anomalous changes/jumps in current phase are eliminated from input data.

Taking the above into account, the proposed method of reducing multipath channel effects on phase measurements of navigation signals includes transmitting navigation signals with different pseudo-random codes by base stations with known coordinates in a prescribed manner located in space; receiving radio signals from base stations at a mobile station into a multi-channel correlation receiver; measuring delay differences and phase differences of signals received from different pairs of base stations at a mobile station; calculating coordinates of a current position of a mobile station according to measured differences of delays and phases, wherein for transmitting signals, base stations use radio channels different not only in code used, but also in other parameters, for example, in carrier frequency, polarization type, spatial position etc.; the number of radio channels exceeds the number that is necessary to implement navigation measurements; radio signals from some base stations are received at the rover; an estimate of current full phase of the received signal is generated in each radio channel of the multichannel correlation receiver; (the term "full phase" means a current phase value of the received signal comprising all phase components, including phase incursion due to carrier (or average) frequency of the received signal); intensity, for example, rate or acceleration of changing the current full phase of the received signal is controlled at the output of each radio channel of the multichannel correlation receiver; results of estimating the current full phase of the received signal in the given channel are eliminated from initial data in solving the navigation task when an abnormal change rate of the current full phase is detected.

A first embodiment of the proposed method includes when base stations are transmitted signals with different polarization type, at a mobile station said signals are received at several antennas with the same phase center and different polarization types of the received signal; and signal from the output of each antenna is fed to the input of the corresponding channel of the multichannel correlation receiver.

In a second embodiment of the proposed method, an abnormal measurement of the current full phase of the received signal in each radio channel is detected by exceeding increment square or modulo of the full phase for the assigned threshold level.

In a third embodiment of the proposed method, an abnormal measurement of the current full phase of the received signal in each channel is detected by exceeding the second increment square or modulo of the full phase for the assigned threshold level.

Figure 7:
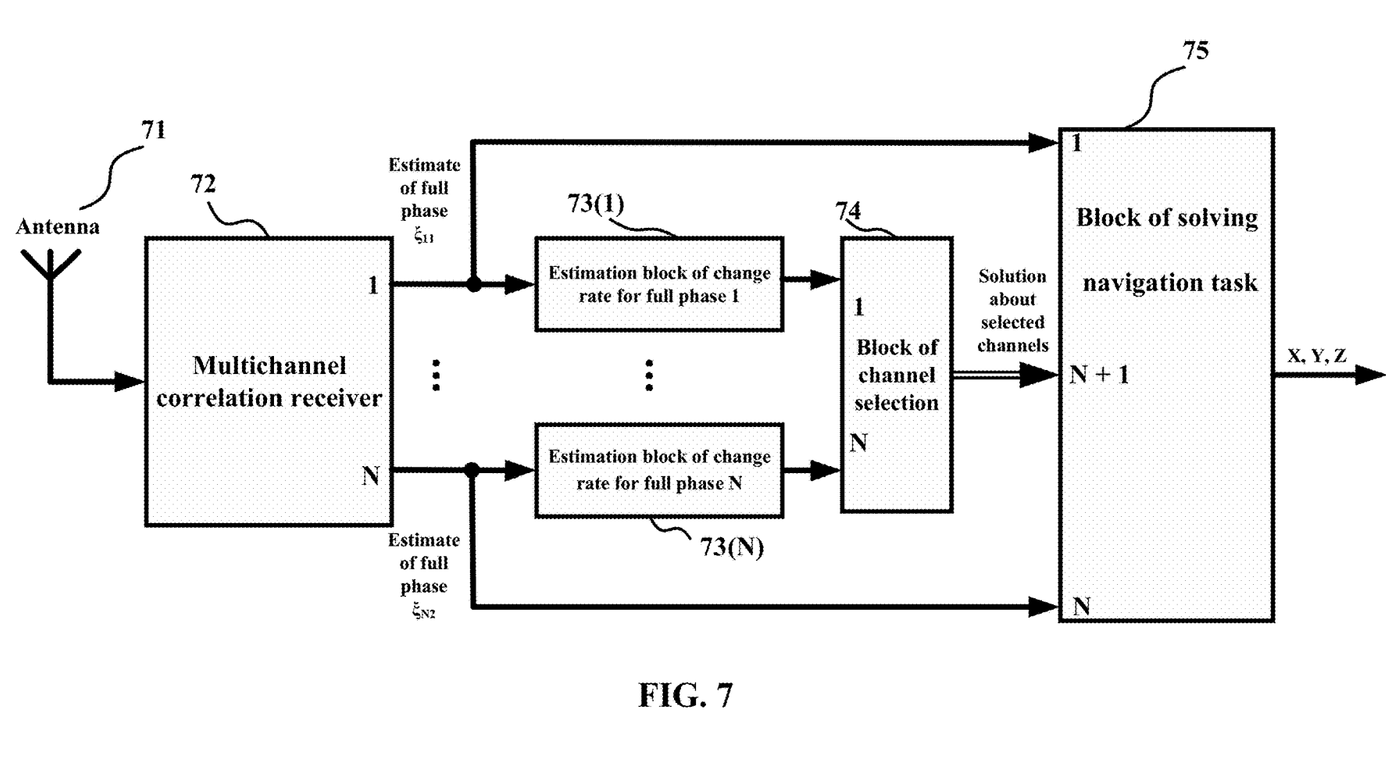
FIG. 7 illustrates a block-diagram of a single-antenna receiver with redundancy of full phase estimates in order to increase the accuracy of evaluating local coordinates.
Figure 8:
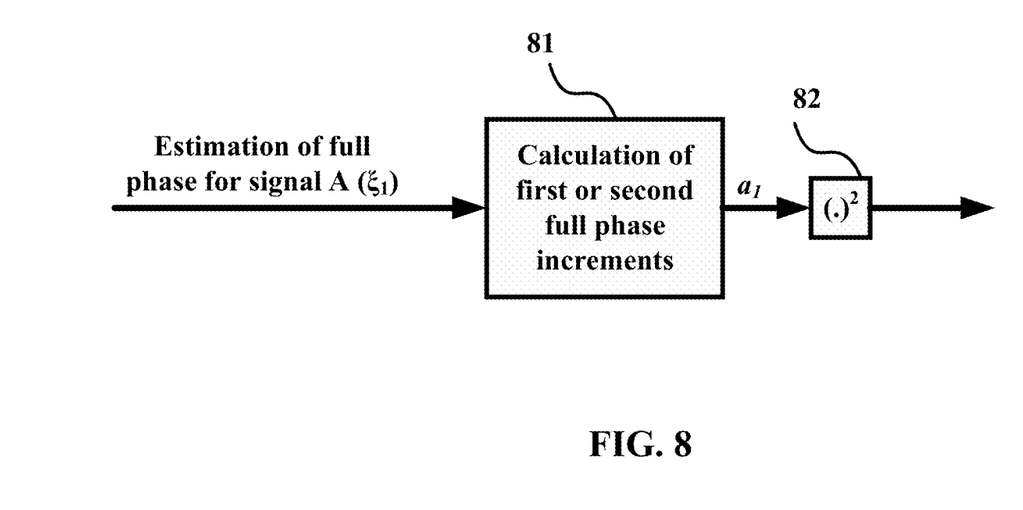
FIG. 8 shows an embodiment of a block of estimating full phase change rate.
Figure 9:
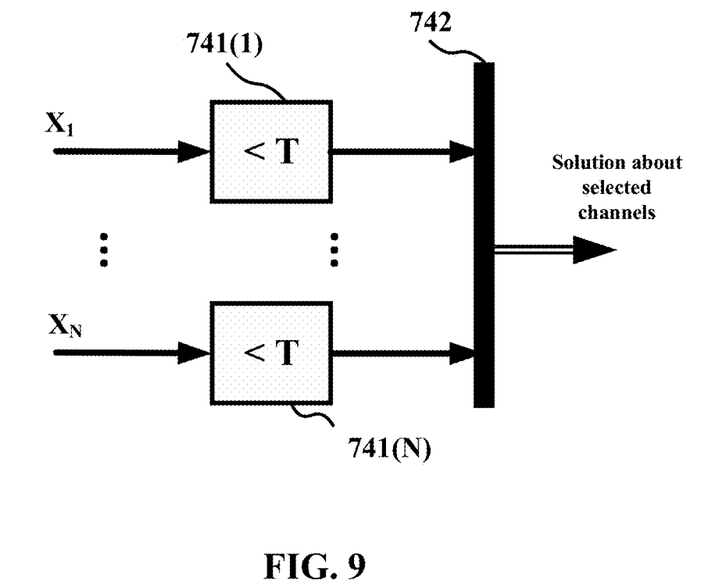
FIG. 9 shows a schematic diagram of a channel selection block.

An apparatus for reducing multipath effects on phase measurements of navigation radio systems (see figures) includes an antenna 71, a multichannel correlation receiver 72, a block of solving navigation task 75, (see figures) such that each radio channel has blocks of estimating the intensity of changing current full phase 73(1) . . . 73(N) and a block of channel selection 74, with the output of multichannel antenna block 71 being connected with the corresponding input of multichannel correlation receiver 72, the outputs of which are connected with the inputs of blocks of estimating full phase change rate 73(1) . . . 73(N) and corresponding inputs of the block of solving navigation task 75, and the outputs of blocks of estimating full phase change rate 73(1) . . . 73(N) are connected with the corresponding inputs of the block of channel selection 74, the output of which is switched to the additional N+1 input of navigation task block 75, the output of which is the output of the apparatus.

Another embodiment of the proposed apparatus is the case when blocks of estimating full phase change rate 73(1) . . . 73(N) are made as a serial-connected calculation block of second increments of full phase 81, squaring block 82 or modulo calculation block, the output of which is the output of the corresponding block of estimating full phase change rate 73(1) . . . 73(N).

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

In the drawings.

DETAILED DESCRIPTION OF EMBODIMENTS OF THE INVENTION

Reference will now be made in detail to the preferred embodiments of the present invention, examples of which are illustrated in the accompanying drawings.

A positioning system uses base stations located at points of known coordinates. These base stations transmit signals, which are received and processed by the rover. The rover receives signals from multiple base stations, and uses a range-difference method or any other known method to calculate current coordinates and/or velocity.

In the simplest case, when phase measurements are performed and only relative coordinates are needed, the navigation signals can be purely harmonic signals. Additional detail can be found in literature, see, e.g., [1], [2], [3], incorporated herein by reference in their entirety Local positioning radio systems, operating in intense multipath environments when signals are transmitted from reference (base) stations, mainly present the background of the proposed technical solutions.

When multipath signals present in a measuring radio channel, it results not only in fading effects of the received signals, but also in non-controlled signal phase jumps, the latter strongly affects the accuracy of phase measurements and hence the accuracy of rover's current coordinates.

Figure 11:
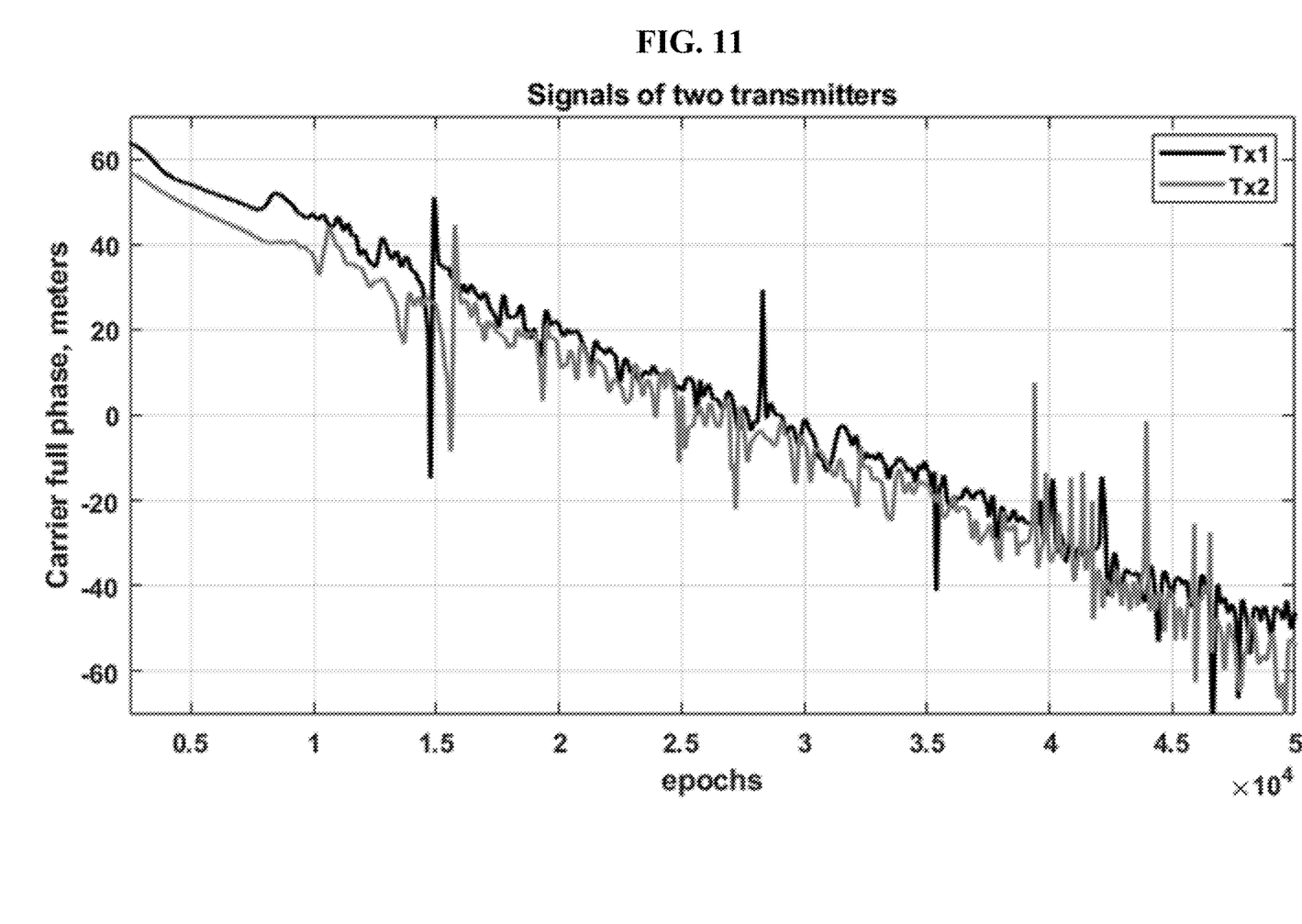
FIG. 11 illustrates an example of experimental measurements of full phase of signals from two receivers under conditions of multipath reception.

FIG. 11 illustrates an example of experimental measurements of full phase of signals from two receivers under conditions of multipath reception. As can be seen in the figure, there are clearly visible jumps of full phase, which will lead to an increase in the error of current coordinate determination. These jumps represent anomalous behavior of the full phase, and are caused by multipath reception of the signals from the respective base stations.

A technical result from the proposed invention is achieved by increasing the positioning accuracy of phase measurements in conditions of multipath channels.

This objective is achieved by measurements redundancy and logical (nonlinear) filtration of current phase estimates.

The core of the proposed invention is a method and its implemented apparatuses providing a reduction in effects of non-controlled jumps of received signal phases, which occur in multipath channels during propagating radio waves on the accuracy of determining coordinates of local and global positioning systems based on phase measurement methods.

Figure 1:
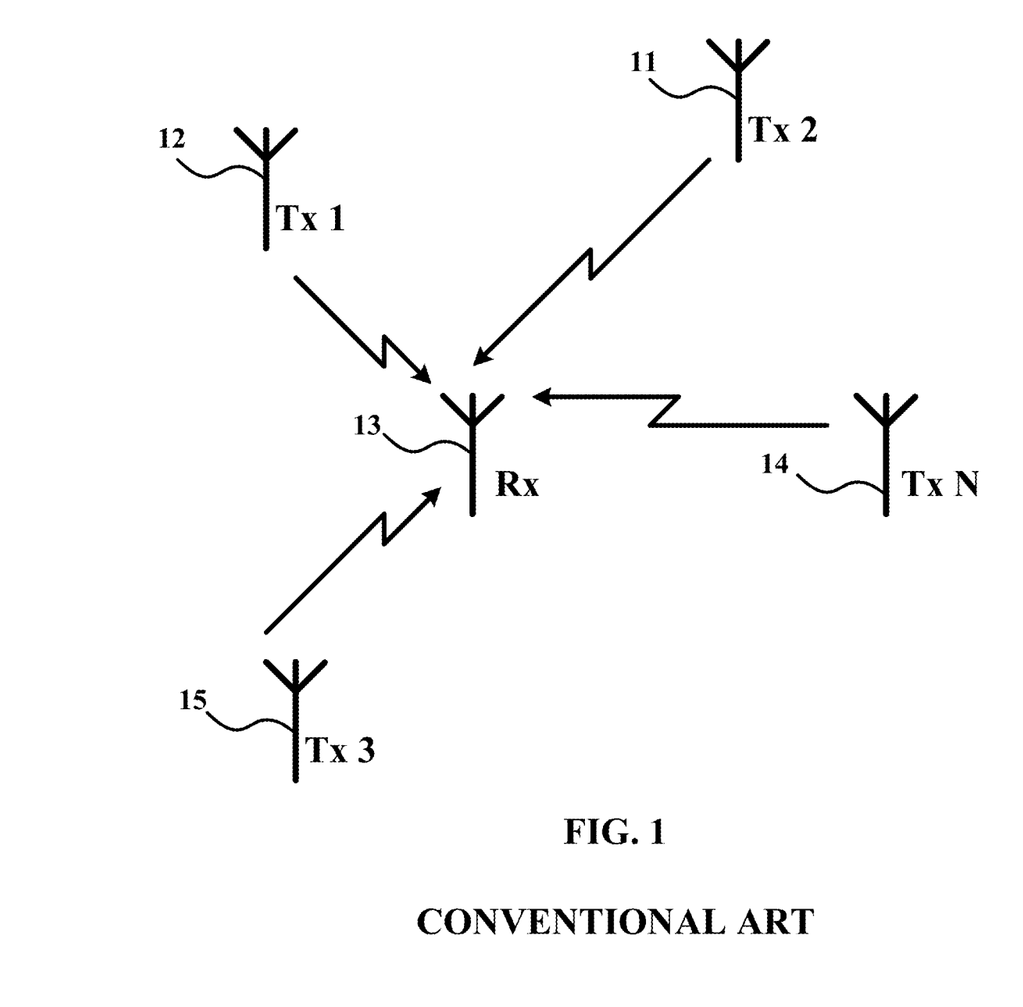
FIG. 1 presents a general diagram of a positioning radio system.

A general view of a positioning system is given in FIG. 1. There are generally a few reference (base) stations with known coordinates Tx1 . . . TxN transmitting navigation radio signals of a predetermined structure.

A movable object—rover— receives navigation signals from the base stations and after processing them determines its current coordinates and movement speed. Any known method can be used to solve the navigation task, such as a range-difference method. To determine coordinates of a movable object in a plane, at least three base stations are necessary. When one determines coordinates in 3D space, four base stations are needed. In practice, for many cases the number of base stations "observable" by a rover can essentially exceed a minimal number needed for solving the task of rover's current positioning.

Modern navigation positioning systems employ code and phase measurements. Phase measurements allow a considerable increase in coordinate estimation methods and make the total positioning errors essentially less than carrier wavelength.

Figure 2:
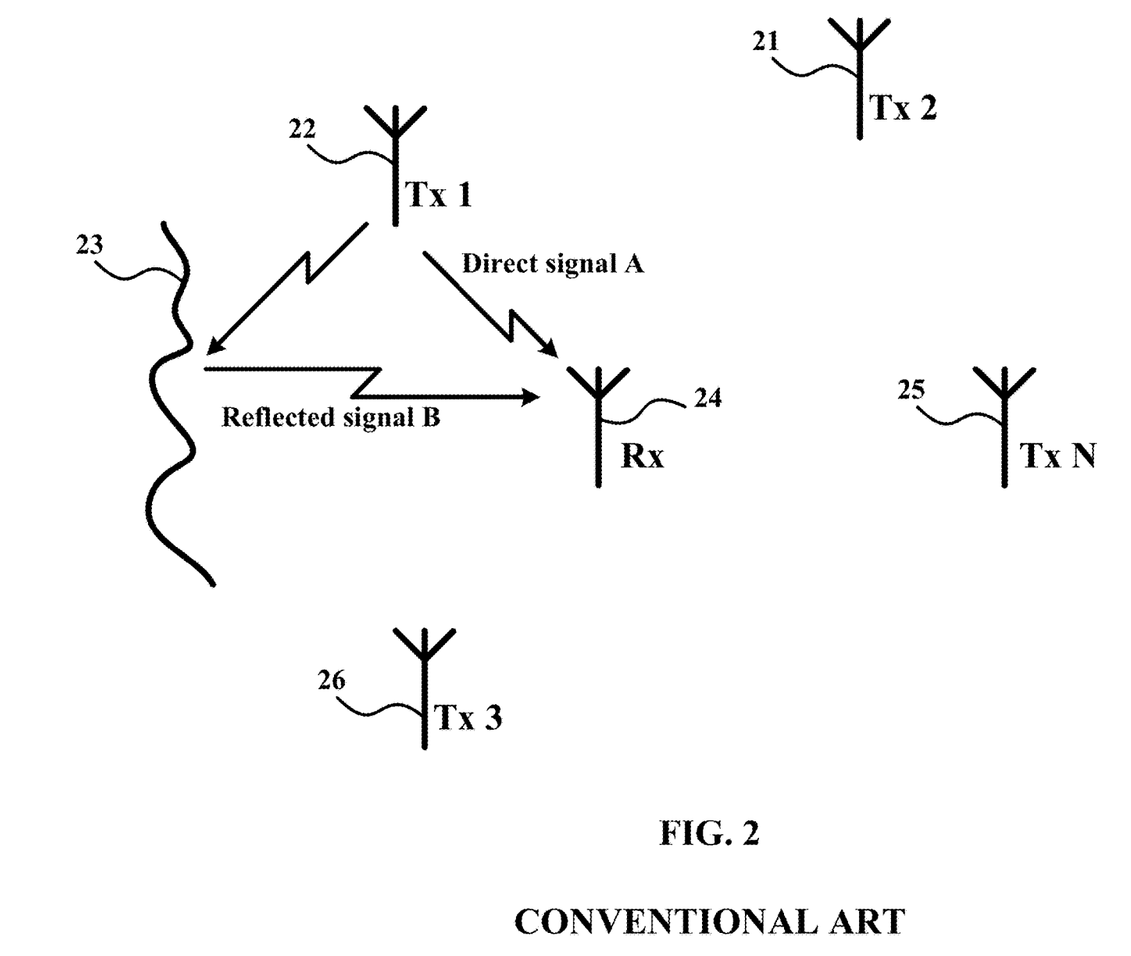
FIG. 2 illustrates multipath signal propagation from one transmitter to one antenna.

But in practice, particularly in local positioning systems, multipath signals are present, see FIG. 2. In this case, the signal received by rover's receiver is a sum of the direct signal and a signal/signals reflected from any local objects. The latter has different path length to the reception point and hence different phase delays. Moreover, they can be different in amplitude. In rover motion, the phase difference of these signals change and at certain time instants, these signals can become anti-phased. If signal levels are quite close, the summing signal "fades", i.e., its signal level becomes low or even zero. In such cases, when signal takes its minimal value, there are uncontrollable hopping changes of the total signal phase.

Figure 3:
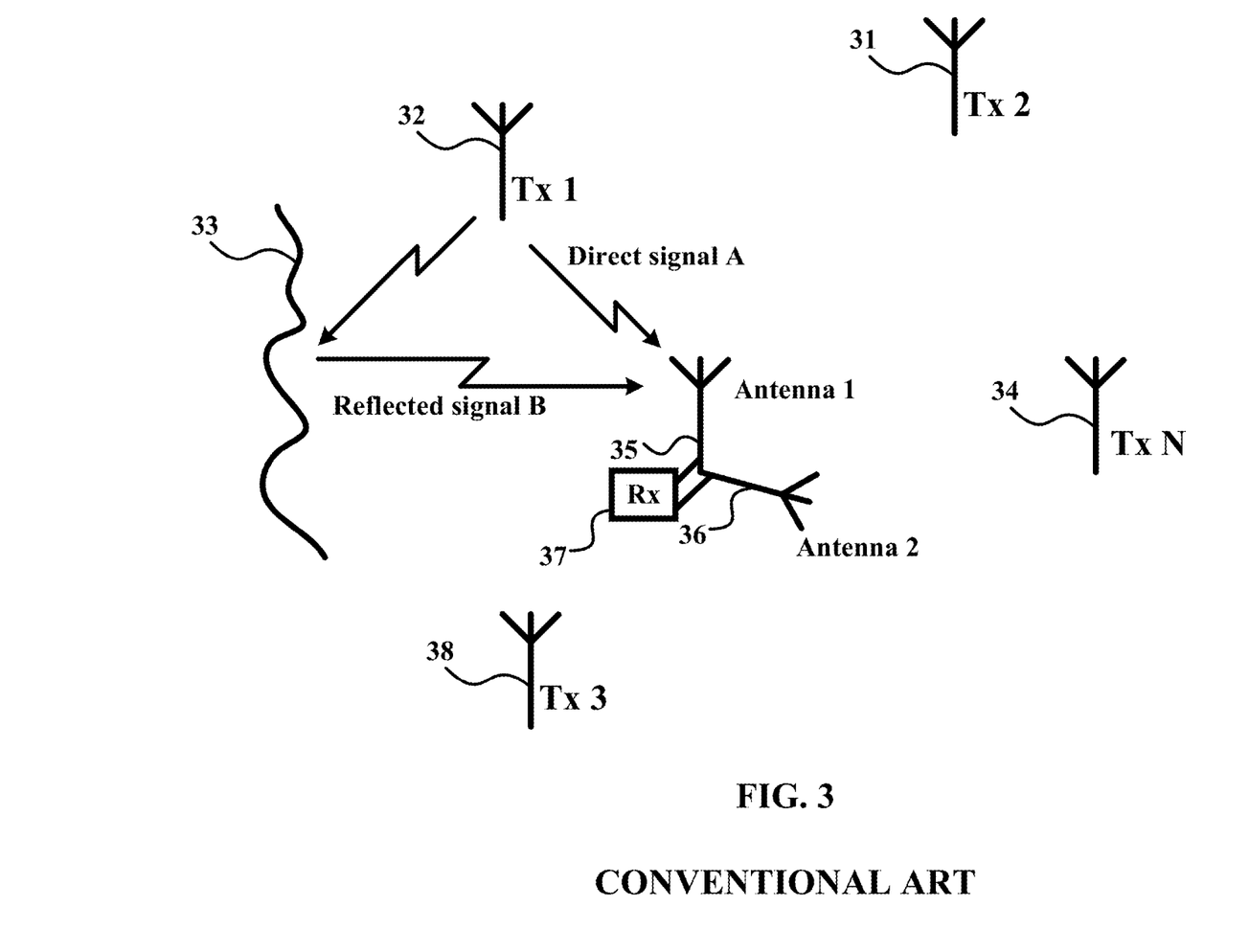
FIG. 3 illustrates multipath signal propagation from one transmitter to two independent receiving antennas with a common phase center.

To combat multipath effects, for example, the reception of signals to two independent antennas with different polarization can be used (FIG. 3). In this case, antennas with common phase center can normally be used.

Figure 4:
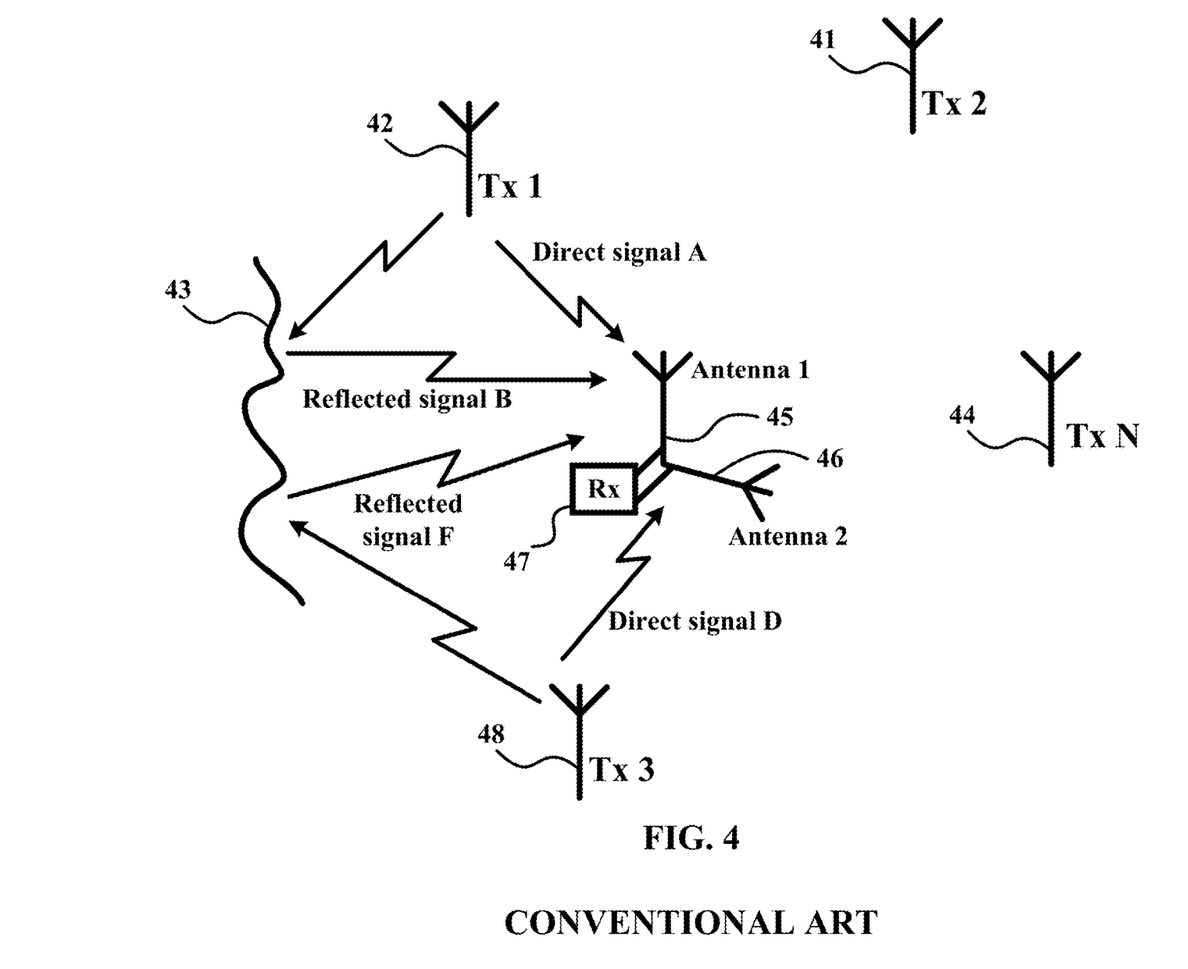
FIG. 4 illustrates multipath signal propagation from two transmitters to two independent receiving antennas with common phase center.

Multipath propagation of signals from two transmitters and their reception to two independent antennas with common phase center is shown in FIG. 4. In these case the transmitters can operated on different carrier frequencies, which allows a more efficient multipath suppression.

Figure 5:
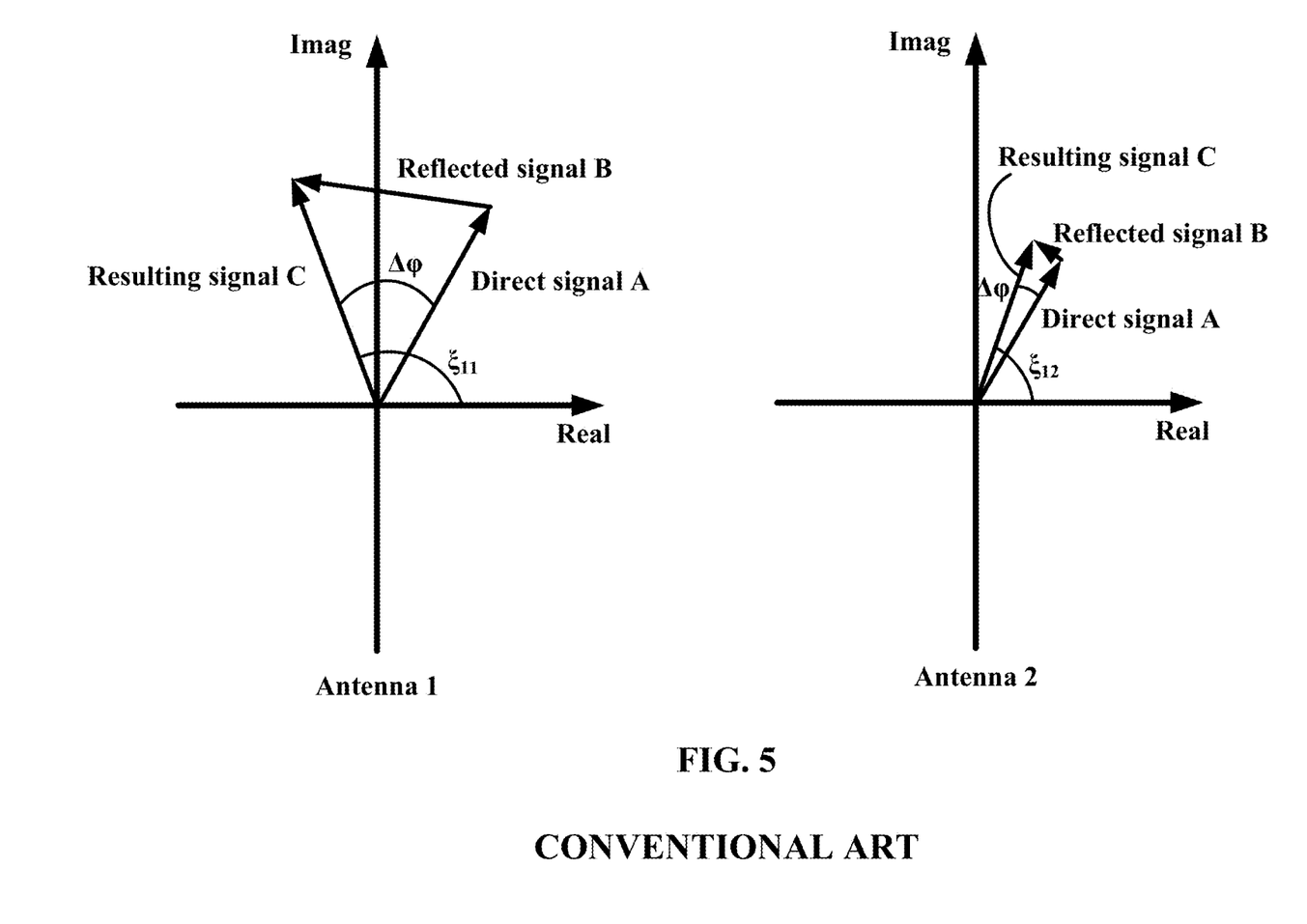
FIG. 5 shows vector signal diagrams for the case of FIG. 3.

FIG. 5 presents vector signal diagrams for the case of FIG. 3. When a signal is reflected from local objects, its polarization is changed, therefore, the use of antennas with different polarization ensures to eliminate simultaneous signal fading in both receiving antennas.

Figure 6:
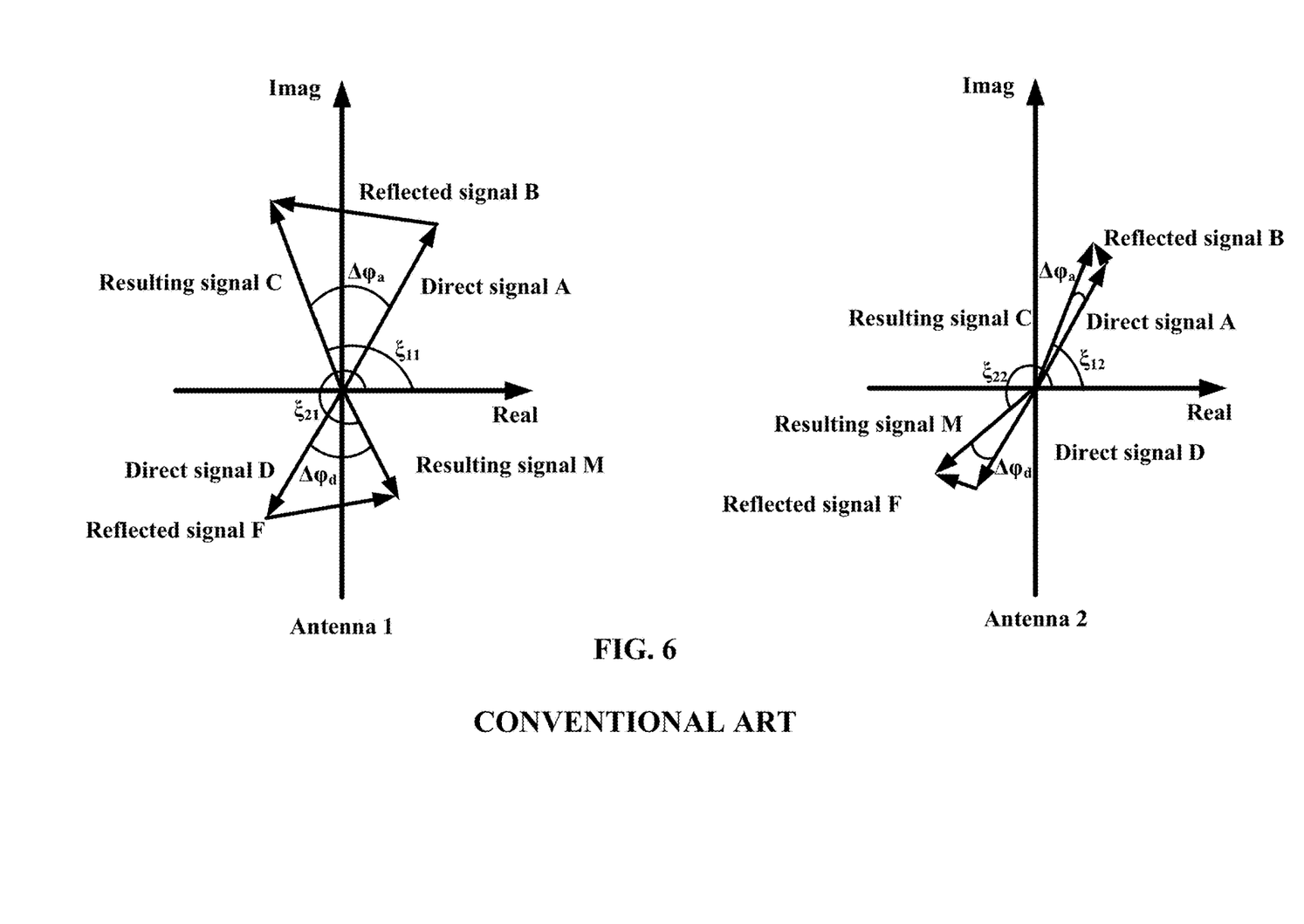
FIG. 6 shows vector signal diagrams for the case of FIG. 4.

A similar effect is observed when a signal is received from two or more transmitters FIG. 6. Its advantage relates to both different antenna polarization and different transmitter frequencies.

So, signal reception to differently-polarized antennas and transmitters' different carrier frequency can serve a basis for building a multipath-immune positioning system.

Taking the above into account, reduction of multipath effects on phase measurements of navigation positioning radio systems works as follows:
  transmitting navigation signals with different pseudo-random codes by base stations having known coordinates and located in space in a predetermined manner;
  receiving radio signals transmitted by base stations to a multichannel correlation receiver at a mobile station;
  measuring a delay difference and a phase difference of signals received from different pairs of base stations;
  calculating a current mobile position according to the measured differences of phase and delay, wherein
  for transmitting navigation signals the base stations use radio channels distinguishing not only in the used code but also in some other parameters, for example, in carrier frequency, polarization type, spatial position etc.;
  the number of radio channels exceeds the number of channels needed for implementing navigation measurements;
  radio signals from some base stations are received at a mobile station;
  an estimate of current full phase of the received signal is generated in each radio channel of the multichannel correlation receiver;
  change rate, for example, speed or acceleration of changing current full phase of the received signal is controlled at the output of each channel of the multichannel correlation receiver;
  when an anomalous change in full phase (see FIG. 11) is present in a channel, the results of estimating current full phase of the received signal in the given channel are eliminated from the original data in solving the navigation task.

In an embodiment, when base stations are transmitting navigation signals with different polarization type, these signals are received at a mobile station in multiple antennas with the same phase center and different polarization types, the signal from the output of each antenna being fed to the input of the corresponding channel of the multichannel correlation receiver.

In addition, an anomalous change in current full phase of the received signal can be detected in each channel based on exceeding square or modulo of the first or second increment of current full phase for the preset threshold level/value. A required numerical threshold value can be determined in a calibration process of phase measurement, as well as based on experimental or simulation measurement results. As abnormal full phase change can both move down in and move up in, it is reasonable to compare the absolute value characterizing full phase change rate with a threshold. For example, it can be modulo or square of the first or second increment of current full phase.

A technical implementation of the proposed method can be made as a single-antenna receiver with redundancy of full phase estimates to increase the accuracy of evaluating local coordinates. A diagram of the receiver is given in FIG. 7.

Navigation signals from reference stations are received by antenna 71 and further fed to a typical multichannel correlation receiver 72, at the output of which there are generated estimates of current full phase for each measuring channel, the estimates being fed to the corresponding inputs of navigation task block/block of solving navigation task 75, at the output of which there are generated an estimate of rover's current coordinates (absolute or relative depending on the task solved). Moreover, the estimate of current full phase for each measuring channel from the corresponding output of multichannel correlation receiver 72 is fed to the input of the corresponding block of change rate estimation for current full phase of the corresponding channels 73(1) . . . 73(N), where an overthreshold signal is generated at exceeding the threshold of full phase change rate. The outputs of the change rate estimation block of the corresponding channels 73(1) . . . 73(N) are connected with corresponding inputs of channel selection block 74, at the output of which there are generated signals corresponding to the channel numbers wherein the threshold has been exceeded. These numbers of measuring channels are fed to a data bus line, for example, to the N+1 input of navigation task block 75, and in accordance with this information from the solution of the navigation task at the relevant step, the current estimates of full phase in the indicated channels are eliminated.

An embodiment of a block of estimating change rate of full phase 73($i$) ($i$=1 ... N) is shown in FIG. 8. Block 81 calculates a first or a second increment of current full phase. And block 82 is responsible for squaring or taking modulo of the obtained phase increment.

The anomalous change of current full phase of the received signal in each radio channel is detected based on exceeding square or modulo of the first of second increments of current full phase for the given threshold level.

Channel selection block 74 operates as follows (FIG. 9): values calculated in change rate estimation block of each channel 73(1) ... 73(N) are fed to its inputs. These values are compared with the threshold in each channel in threshold units 741(1) ... 741(N), at the outputs of the threshold units wherein the threshold has been exceeded, logical unit is generated, at the other outputs—logical 0. A block of generating channel numbers 742 at its output generates data about channel numbers where in the threshold was exceeded.

Figure 10:
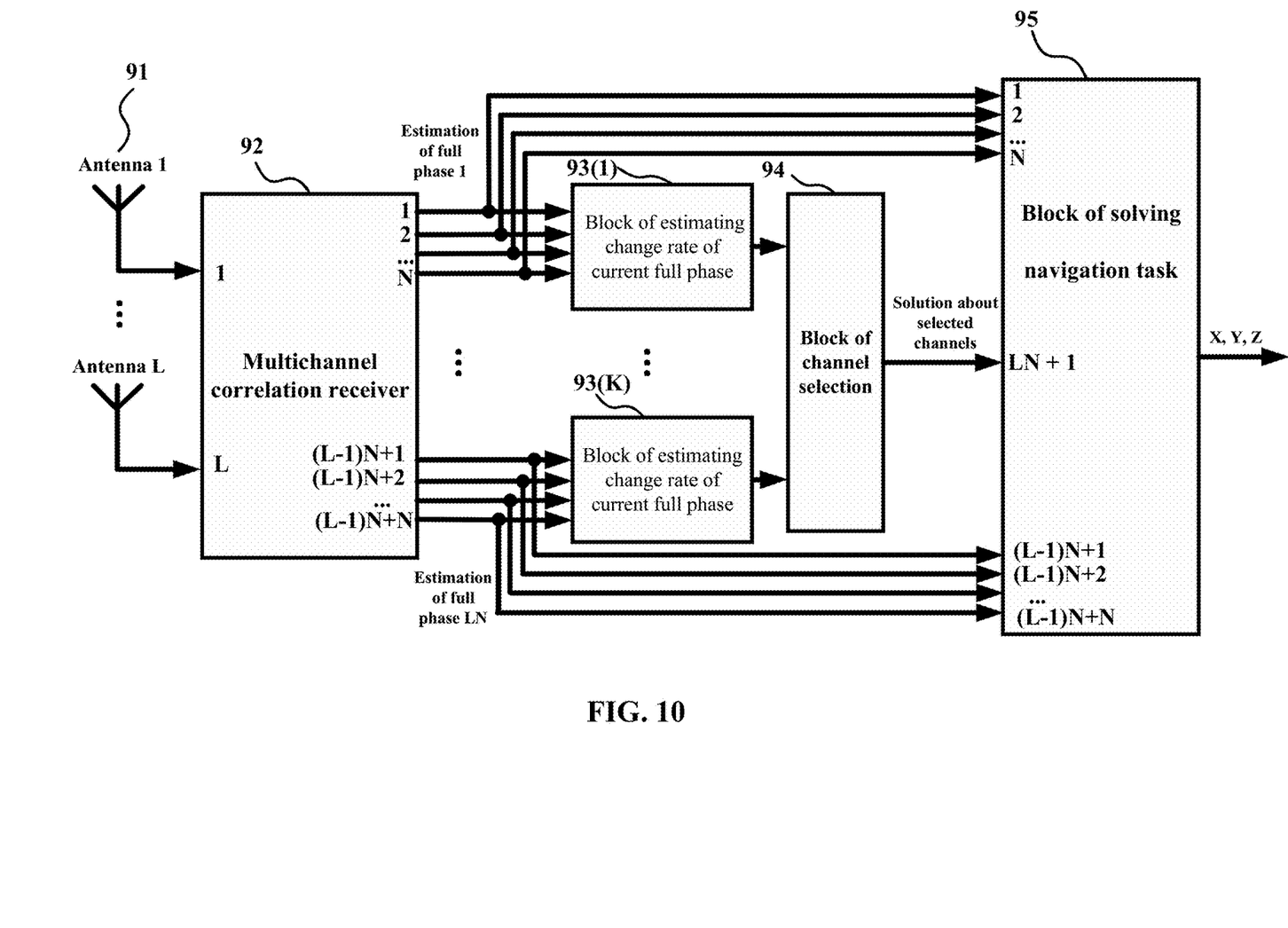
FIG. 10 shows a schematic diagram of a multi-antenna receiver with redundancy of full phase estimates in order to increase the accuracy of evaluating local coordinates.

An embodiment of the proposed method includes a multi-antenna receiver with redundancy of full phase estimation in order to increase the accuracy of evaluating local coordinates; the flow chart of such a block is given in FIG. 10.

As will be appreciated by one of ordinary skill in the art, the various blocks shown in FIGS. 7-10 can be implemented as discrete hardware components, as an ASIC (or multiple ASICs), as an FPGA, as either discrete analog or digital components, and/or as software running on a processor.

Functioning of a multi-antenna receiver is similar to that of the above considered single-antenna receiver. However, the availability of more independent receiving channels ensures a higher level of compensation for multipath effects during reception of radio signals.

Having thus described a preferred embodiment, it should be apparent to those skilled in the art that certain advantages of the described method and apparatus have been achieved. It should also be appreciated that various modifications, adaptations, and alternative embodiments thereof may be made within the scope and spirit of the present invention.

REFERENCES (ALL INCORPORATED BY REFERENCE HEREIN IN THEIR ENTIRETY)

1. Joon Wayn Cheong et al., *Characterising the Signal Structure of Locata's Pseudolite-based Positioning System*, International Global Navigation Satellite Systems Society IGNSS Symposium 2009 Holiday Inn Surfers Paradise, Qld, Australia 1-3 December, 2009.
2. Barnes J., Rizos C., Wang J., Small D., Voigt G & Gambale N. (2003) *Locata: A New Positioning Technology for High Precision Indoor and Outdoor Positioning*, Proceedings 2003 International Symposium on GPS\GNSS, 9-18.
3. Locata Corporation. Technology Brief, http:**www.locata.com/wp-content/uploads/2014/07/Locata-Technology-Brief-v8-July-2014-Final1.pdf

What is claimed is:

1. A method of reducing multipath effects on phase measurements of navigation radio systems, the method comprising:

receiving radio signals with different pseudo-random codes transmitted by at least four base stations on a multichannel correlation receiver, each base station's radio signal at a particular frequency being received by one channel;

measuring a delay difference and a phase difference of radio signals received from different pairs of base stations;

calculating a current position of the receiver based on the measured phase differences and delay differences, wherein the base stations differ in pseudo-random codes at same frequencies or differ in carrier frequency or polarization type if using the same pseudo-random codes, and wherein a number of channels in the receiver exceeding a number of channels needed for the calculating of the current position;

detecting anomalous jumps in the current full phase of one or more channels, based on a first or second derivative of the current full phase, as being indicative of multipath signal reception in the one or more channels;

removing the one or more channels from the calculation of the current position; and calculating the current position based on the measured phase differences and delay differences in remaining channels.

2. The method of claim 1, wherein when the base stations transmit the radio signals with the different polarization types, the radio signals are received by the receiver using multiple antennas that have the same phase center and different orientation.

3. The method of claim 1, wherein the anomalous jump is detected based on exceeding square or modulo of a first increment of the current full phase for a preset threshold value of the square.

4. The method of claim 1, wherein the anomalous jump is detected based on exceeding square or modulo of a second increment of the current full phase for a preset threshold value of the modulo.

5. A navigation receiver comprising:

a plurality of channels receiving radio signals with different pseudo-random codes transmitted by at least four base stations on a multichannel correlation receiver, each base station's radio signal at a particular frequency being received by one channel;

each pair of channels measuring a delay difference and a phase difference of radio signals received from different pairs of base stations;

the receiver calculating a current position based on the measured phase differences and delay differences;

wherein the base stations differ in pseudo-random codes at same frequencies or differ in carrier frequency or polarization type if using the same pseudo-random codes, and wherein a number of channels in the receiver exceeds a number of channels needed for the calculating of the current position;

the receiver detecting anomalous jumps in the current full phase of one or more channels, based on a first or second derivative of the current full phase, as being indicative of multipath signal reception in the one or more channels;

the receiver removing the one or more channels from the calculation of the current position; and the receiver calculating the current position based on the measured phase differences and delay differences in remaining channels.

6. The receiver of claim 5, wherein the anomalous jump is detected based on exceeding square of a first increment of the current full phase for a preset threshold value of the square.

7. The receiver of claim 5, wherein the anomalous jump is detected based on exceeding modulo of a first increment of the current full phase for a preset threshold value of the modulo.

8. The receiver of claim 5, wherein the anomalous jump is detected based on a rate of change of the current full phase being non-linear.

9. The receiver of claim 5, wherein the anomalous jump is detected based on square or modulo of a first derivative of the current full phase being non-zero and greater than a predefined threshold.

10. The receiver of claim 5, wherein the anomalous jump is detected based on square or modulo of a second derivative of the current full phase being non-zero and greater than a predefined threshold.

\* \* \* \* \*